United States Patent

Fadavi-Ardekani et al.

Patent Number: 6,108,371
Date of Patent: Aug. 22, 2000

[54] SYSTEM AND METHOD FOR WRITING MIXED INTERLEAVED AND NON-INTERLEAVED DATA TO A MODEM REGISTER

[75] Inventors: Jalil Fadavi-Ardekani, Orefield; Frederick Harrison Fischer, Macungie, both of Pa.

[73] Assignee: Lucent Technologies Inc., Murray Hill, N.J.

[21] Appl. No.: 08/647,491

[22] Filed: May 14, 1996

[51] Int. Cl.⁷ .............................. H04B 1/40; G06F 12/00
[52] U.S. Cl. .................. 375/222; 711/5; 711/157
[58] Field of Search ..................... 375/222, 219, 375/372, 220; 395/405, 427, 410, 821, 823, 843, 824, 842, 846, 848, 872; 371/5.1, 2.2; 364/242.3, 242.31, 242.33, 242.34; 379/90.01, 93.01; 455/557; 711/5, 121, 157

[56] References Cited

U.S. PATENT DOCUMENTS 5,623,449  4/1997  Fischer et al. .......................... 315/200
5,664,116  9/1997  Gaytan et al. ..................... 395/200.64

*Primary Examiner*—Chi H. Pham
*Assistant Examiner*—Willaim Luther

[57] ABSTRACT

A modem having an interactive clearing circuit that provides the facility for the modem to mix interleaved and non-interleaved writes to a FIFO without timing problems or data transfer problems associated with the prior art. The circuit includes a self-clearing error bit circuit that clears the error bits of an interleaved write from the LSR after each FIFO write. In one embodiment, the clearing circuit provides dummy bits to the LSR upon each controller write to the FIFO. This prevents error bits associated with previous interleaved writes from becoming associated with subsequent non-interleaved writes.

21 Claims, 3 Drawing Sheets

SYSTEM AND METHOD FOR WRITING MIXED INTERLEAVED AND NON-INTERLEAVED DATA TO A MODEM REGISTER

FIELD OF THE INVENTION

The present invention relates to data communications equipment, and more particularly to a modem having a circuit for clearing error bits from a MIMIC FIFO register.

BACKGROUND OF THE INVENTION

Digital terminal equipment (DTE), such as computers and facsimile machines, routinely send and receive information and control signals through communications networks (i.e. the telephone network). In order to effectively use the network facilities, however, the DTE must have a means of translating digital data into a form suitable for transmission over the network. Similarly, DTE devices at the receiving end must have a means for translating that signal back into digital form, check for errors, and make use of the information.

The most common data communication equipment (DCE) that provides a DTE with these facilities is a modem. Basically, a modem is capable of modulating and demodulating digital data over a communication medium of a communications network. For example, in communicating over a telephone network, one modem translates the digital data generated by the originating DTE into an analog signal and sends the signal over the telephone network to a second modem at the receiving end. The receiving modem then translates the analog signal back into the digital data at the receiving DTE.

A typical modem architecture is shown in FIG. 1. The typical modem has a controller and a digital signal processor (DSP) which are electrically connected to each other through an interface circuit (i.e. VALV). The DSP and the interface circuit together form a data pump which is responsible for taking the digital data from the controller, modulating or formatting the data, and transmitting the data over the line. The controller provides supervisory functions such as inserting control commands in the data stream, providing data compression, and performing error bit calculations.

As shown in FIG. 1, a typical modem also has a MIMIC and a line status register (LSR) which are electrically connected to the controller data bus. A MIMIC is a circuit that mimics the register set of a universal asynchronous receiver transmitter (UART). The MIMIC contains two large FIFO registers, a receiver channel (Rx) FIFO and transmit channel (Tx) FIFO, that act as data buffers to allow the DTE to communicate asynchronously with the DCE or modem controller. The LSR is basically a register through which transmission error data flows during modem operation.

In a typical modem, data received by the modem passes through the Rx FIFO, whereas data transmitted from the modem passes through the Tx FIFO. The LSR is typically an 8 bit register, wherein three of the eight bits indicate specific errors detected during transmission of a specific 8 bit byte of transmission data. The Rx FIFO of the MIMIC receiver channel is typically 11 bits wide, 8 bits for the transmission data and 3 bits for the error bits from the LSR.

For each 8 bit byte of data received from the transmission line, the controller of a typical present day modem performs a series of interleaved writes to the Rx FIFO and the LSR. That is, as data is received by the modem, the controller first writes the 3 error bits associated with a particular 8 bit byte of data to the LSR, and then writes the 8 bit byte of data to the Rx FIFO. During this FIFO write, however, the three bits located in the LSR are automatically pulled from the LSR, in parallel with the 8 data bits, to fill the 11 bit wide Rx FIFO register. This 11 bit word is then sent to the receiving DTE for processing. The procedure of writing to the LSR and then the FIFO is called an interleaved write. In present day modems, the interleaved write is repeated for each 8 bit byte of data received by the modem.

The automatic interleaved write for all data transfers, however, can cause error bits to be included with the wrong data and it can reduce the available modem timing overhead. For example, when using the MIMIC to transfer memory information from the controller memory to the receiving DTE (i.e. a DMA transfer), there is not a great concern for data error. The memory is highly reliable and usually travels a very short distance without repeaters from controller memory to the local DTE. As a result, it is unnecessary, and thus wasteful for a controller to perform interleaved writes during DMA transfers for each 8 bit byte of data transferred from the controller memory to the MIMIC FIFO. For such DMA data transfers, the modem need only perform a non-interleaved write for the substantial likelihood of a successful transfer of error-free data. That is, the controller need only write the 8 bits of memory data to the FIFO (no LSR write is necessary). This is called a non-interleaved write.

During a non-interleaved write in present day modems, however, the controller uses the same FIFO write instruction to put the memory information into the FIFO as it uses during an interleaved write. As a result, if a present day modem were to attempt a non-interleaved write of a given data word from the modem controller to the FIFO, the error bits that were written into the LSR during the most recent interleaved write would automatically be pulled into the FIFO, and thus become associated with the bits of the given data word. That is, the error bits from an unrelated 8-bit byte of data would become associated with the 8-bits of data sent during the non-interleaved write. As a result, if a present day modem were to attempt to perform a non-interleaved write without some software and/or hardware changes, errors would become associated with data words for which there was no error. Thus, present day modem controllers can not freely perform both non-interleaved and interleaved writes to the same MIMIC Rx FIFO.

SUMMARY OF THE INVENTION

Accordingly, the present invention is directed to a circuit and method of providing for the mixing of interleaved and non-interleaved writes to a FIFO to substantially reduce the timing overhead and error bit problems associated with the prior art. To attain this, the present invention provides a modemn having a self-clearing circuit that automatically clears the error bits of an LSR after each Rx FIFO write.

In one embodiment of the invention, an error clearing circuit is electrically connected between the LSR and the controller of the modem so that, upon the triggering of the trailing edge of a FIFO write pulse, the clearing circuit clears all three error bits in the LSR. That is, after each Rx FIFO write and before the next interleaved or non-interleaved write cycle, the clearing circuit clears the LSR error bits. This enables the modem to perform both interleaved and non-interleaved writes to the FIFO at any time, without error bits of an interleaved write becoming associated with data from non-interleaved writes. Thus, the present invention overcomes, to a large extent, the limitations associated with the prior art.

These and other features of the invention are described in more complete detail in the following detailed description of the invention when taken with the drawings. The scope of the invention, however, is limited only by the claims appended hereto.

DETAILED DESCRIPTION OF THE INVENTION

Figure 1:
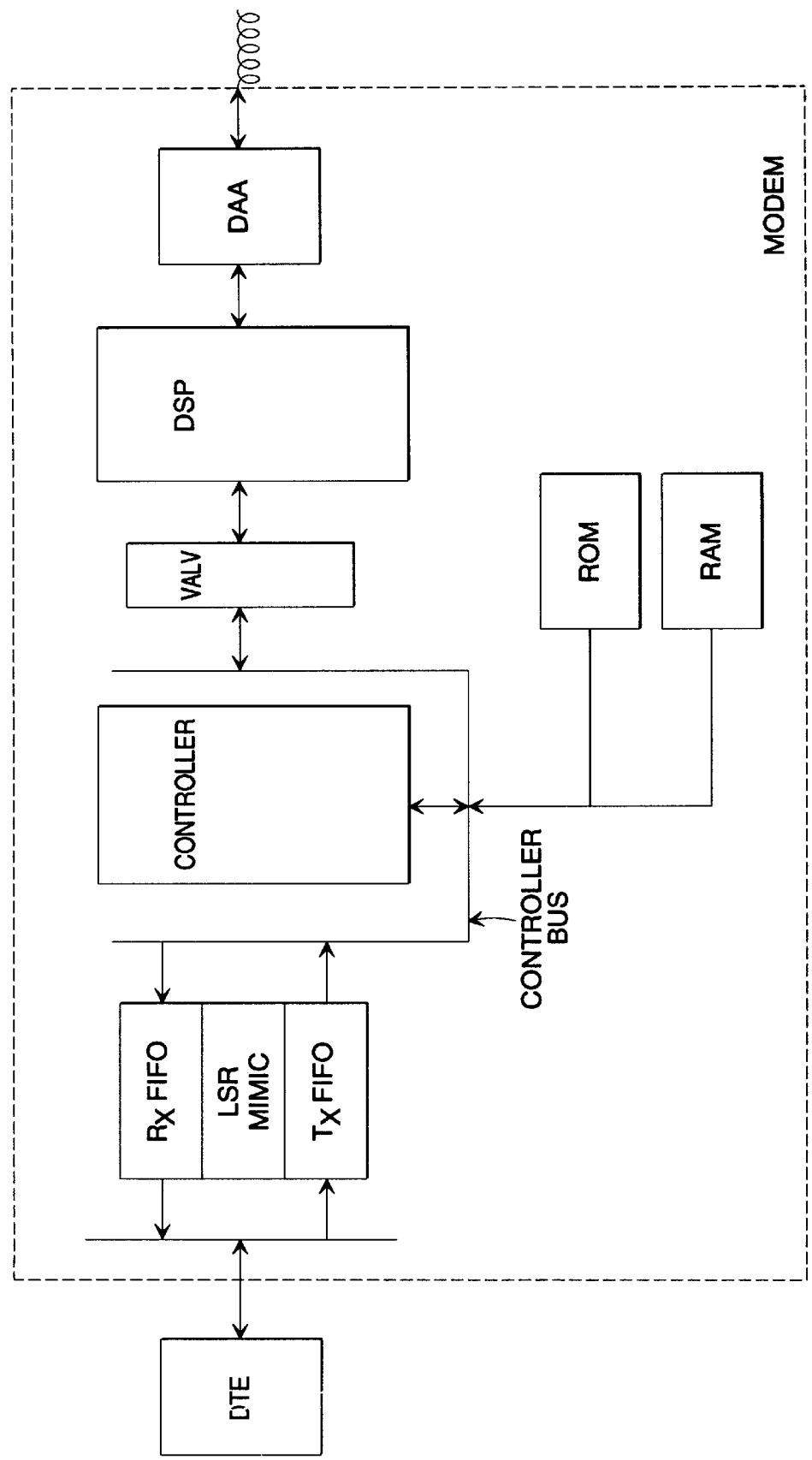
FIG. 1 is a block diagram of a typical prior art modem architecture.
Figure 2:
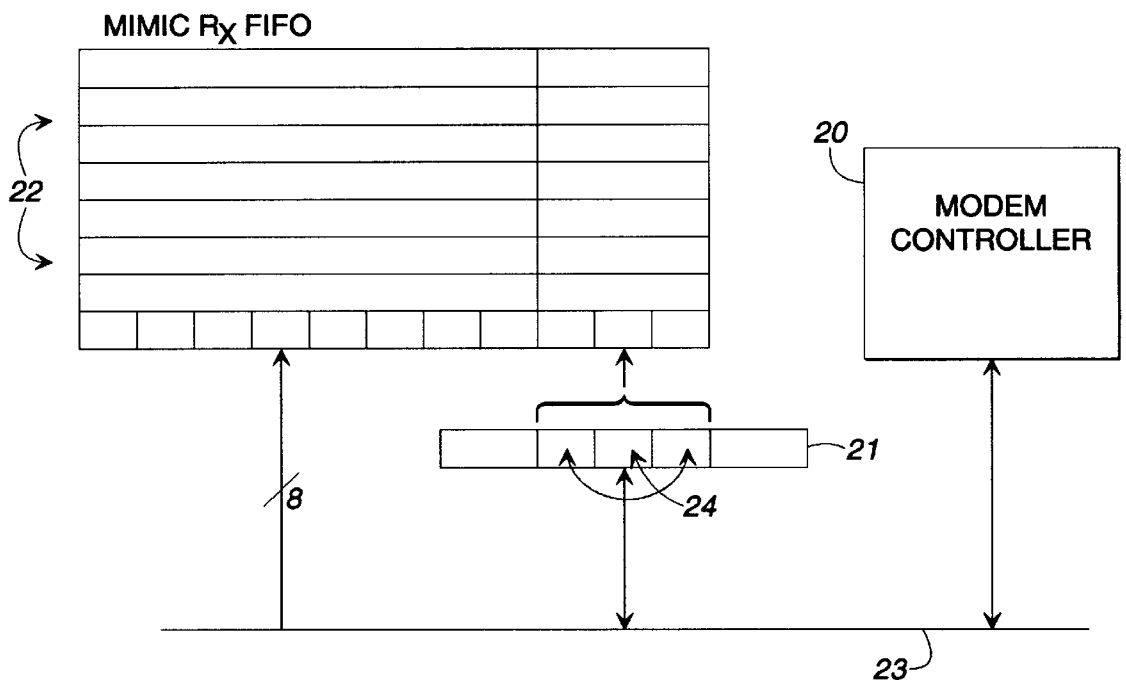
FIG. 2 is a circuit diagram showing the interface between the controller and the MIMIC receiver channel Rx of the typical prior art modem shown in FIG. 1.

As discussed above, a typical modem can transfer digital data to a DTE through the receiver channel Rx of a MIMIC. A typical prior art MIMIC Rx and its interface with the modem controller is shown in FIG. 2. As shown, prior art modem controller 20 is electrically connected to line status register 21 and MIMIC Rx FIFO 22 through data bus 23.

To perform a data transfer to a DTE (not shown), controller 20 performs a series of interleaved writes to the MIMIC Rx FIFO 22 through an LSR write to line status register 21 and a FIFO write to FIFO 22. More specifically, controller 20 first performs the LSR write, wherein three error bits associated with a particular 8 bit byte of data are sent to line status register 21. Then, controller 20 performs the FIFO write, wherein the particular 8-bit byte of data is sent to an 11-bit wide FIFO 22. During the Rx FIFO write, however, three error bits 24 in line status register 21 are simultaneously pulled into Rx FIFO 22, in parallel with the 8 bit byte. As a result, for each Rx FIFO write performed by controller 20, 11 bits are transferred into Rx FIFO 22 (8 data bits and 3 error bits), and thus 11 bits are eventually sent to a DTE (not shown) communicating with that modem.

As discussed above, this present day architecture and procedure for transferring data from a modem controller to a MIMIC is prohibitive of efficiently and successfully transferring both reliable or substantially error-free data and unreliable data having a significant probability of error on to the same MIMIC. More specifically, the architecture and MIMIC write procedure of present day modems can not efficiently mix interleaved and non-interleaved controller data writes to the same MIMIC. When mixing such writes in present day modem, error bits from interleaved writes will become associated with non-interleaved data writes, thus causing data transfer problems. A modem having the architecture of the present invention substantially solves this problem.

Figure 3:
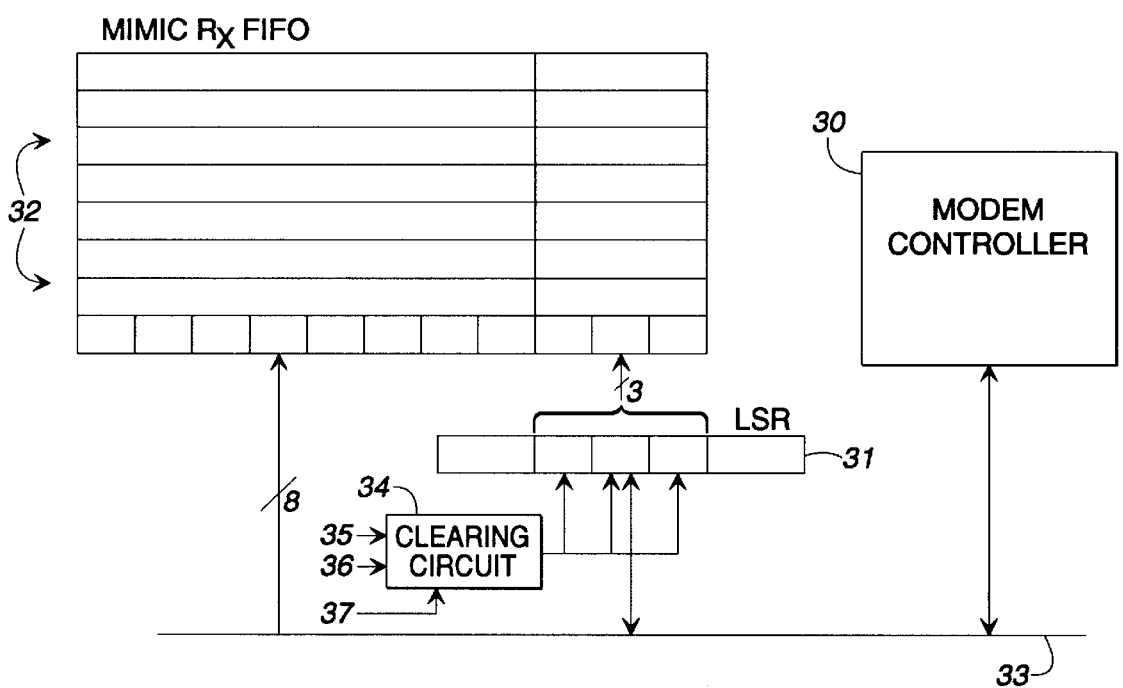
FIG. 3 is a circuit diagram of one embodiment of the present invention showing a MIMIC Rx having an LSR clearing circuit.

Referring now to FIG. 3, there is shown one embodiment of the modem architecture of the present invention, specifically the receiver channel Rx FIFO portion therein. As shown, modem controller 30 is electrically connected to line status register 31 and MIMIC Rx FIFO 32 through data bus 33. Line status register 31 is electrically connected to FIFO 32 and clearing circuit 34. An Rx FIFO write control line 35, a system clock line 36 and a system reset line 37 is electrically connected to clearing circuit 34, wherein the system clock runs at a faster rate than the maximum speed of consecutive Rx FIFO writes from the controller.

In operation, controller 30 performs both interleaved and non-interleaved writes. After each write operation to the FIFO (FIFO write), however, clearing circuit 34 clears the contents of the three error bits to a "000" value (indicating no errors) to line status register 31. More specifically, after each time that controller 30 writes a data word to FIFO 32 through bus 33, clearing circuit 34 clears the error bits in the line status register 31 to essentially remove any error bits left in the register from a previous LSR write from the controller. Although the data word and the error bits can be any size, the illustrative embodiment shows the data word as an 8-bit byte of data, and the error bits including three error bits.

Through the timing provided to clearing circuit 34 through write control signal signals on control line 35, the system clock signal and the system reset, clearing circuit 34 enables controller 30 to mix interleaved and non-interleaved writes to the same Rx FIFO 32.

For an interleaved write, controller 30 first performs an LSR write to register 31 (sending the error bit thereto), and then performs a FIFO write to Rx FIFO 32 (sending the 8 data bits and automatically pulling the error bits in parallel therewith). Upon the completion of the FIFO write, clearing circuit 34 clears register 31 for the next FIFO write, thus eliminating any chance of the error bits from becoming associated with the wrong data byte.

For a non-interleaved write, controller 30 performs a FIFO write wherein an 8-bit byte is sent to FIFO 32 and the error bits in register 31 are pulled therein. Since, however, the error bits from any previous interleaved write were cleared, the error bits pulled into Rx FIFO 32 are dummy error bits. For example, the dummy error bits are set to all zeros indicating that there is no error associated with that particular 8-bit byte of data.

Figure 4:
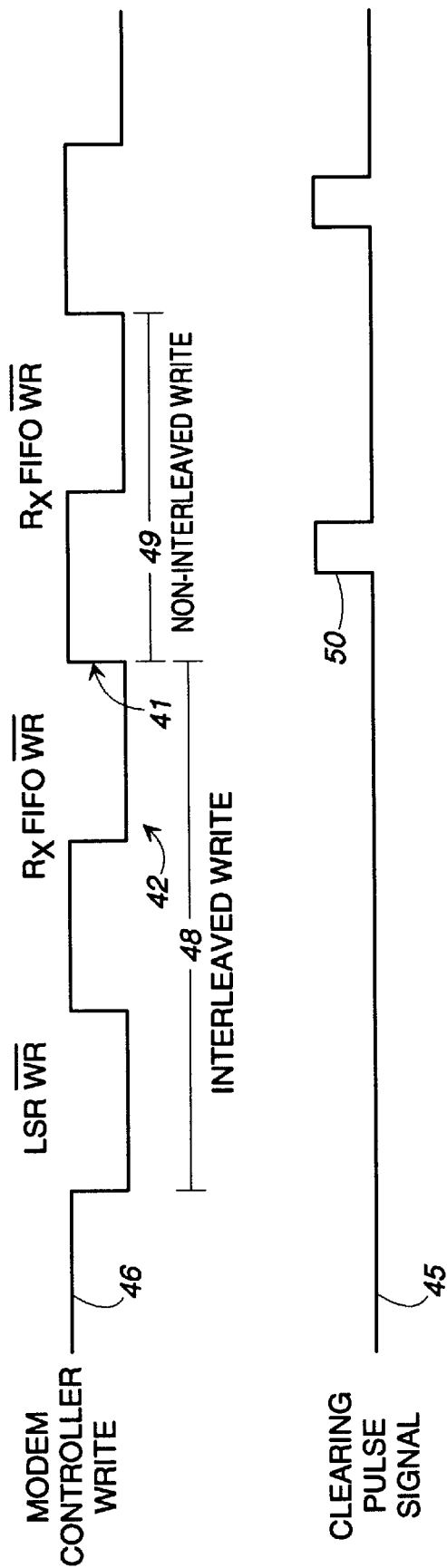
FIG. 4 is a timing diagram showing the relationship between the timing of a modem controller FIFO write pulse and a self clearing pulse for operating a modem having the clearing circuit shown in FIG. 3.

The timing of the triggering of the clearing circuit 34 in relation to the FIFO write signal 35 is shown in FIG. 4. As shown, the clearing circuit is triggered by pulse 50 upon the completion of the FIFO write cycle 42. From this, it is apparent that a key timing aspect is that the clearing pulse 50 of signal 45 is generated after the back edge 41 of the Rx FIFO write pulse 42 of FIFO write signal 46, and completed prior to the beginning of the next possible data flow write. That is, the data is written to the Rx FIFO during non-interleaved writes 48, or to the LSR during interleaved writes 49. As a result, even though clearing signal 45 pulses to clear the LSR error bits after every Rx FIFO write, the clearing circuit does not interfere with the normal data flow. Thus, depending on whether an interleave or a non-interleave write is initiated, the cleared LSR error bits may get immediately overwritten with "real" modem error data (for interleaved writes), or they may serve as "no error" place holders (as in the case of non-interleaved Rx FIFO writes).

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A modem comprising a controller operative to cyclically write data to a FIFO register through a data bus and a line status register, said line status register receiving error data associated with said data written to said FIFO register and content of said line status register being read into a defined portion of said FIFO regiser during each write cycle, and a circuit for causing said line status register to be cleated of any pre-existing content upon said line status register content being read into said FIFO regiter for a given write cycle, and before a beginning of a next-successive write cycle.

2. The modem of claim 1 wherein said circuit for clearing said line status register enables said controller to be operable to provide interleaved and non-interleaved data writes to said FIFO.

3. The modem of claim 2 wherein said circuit for clearing said line status register is electrically connected to a write control signal for said FIFO register, a system clock and a system reset signal.

4. The modern of claim 3 wherein said clearing circuit is triggered through a clearing pulse upon the completion of a cycle of said FIFO register write control signal.

5. The modem of claim 4 wherein said FIFO is a receiver channel (Rx) FIFO.

6. The modem of claim 5 wherein said Rx FIFO is 11 bits wide, wherein 3 bits are for error information and 8 bits are for transmission data.

7. The modem of claim 6 wherein said line status register has three locations dedicated to storing and passing said error information.

8. A modem for transferring data to and from digital terminal equipment, comprising:
  a controller operable to cyclically transfer data to a cotroller data bus;
  a line status register for receiving and passing error bits associated with a data word, said line status register being electrically connected to said controller data bus;
  a first-in first-out (FIFO) register for holding data words transferred from said controller and said associated error bits passed from said line status register, said FIFO register being electrically connected to said line status register and said controller data bus; and
  a circuit for causing said line status register to be cleared of any pre-existing content upon completion of a given data-transfer cycle, and before a beginning of a next-successive data-transfer cycle, said circuit being electrically connected to said line status register.

9. The modem of claim 8 wherein said circuit for clearing said line status register enables said controller to be operable to provide interleaved and non-interleaved data writes to said FIFO.

10. The modem of claim 9 wherein said circuit for clearing said line status register is electrically connected to a write control signal for said FIFO register, a system clock and a system reset signal.

11. The modem of claim 10 wherein said clearing circuit is triggered through a clearing pulse upon the completion of a cycle of said FIFO register write control signal.

12. The modem of claim 11 wherein said FIFO register is operated as a receiver channel (Rx) FIFO.

13. The modem of claim 12 wherein said Rx FIFO is 11 bits wide, wherein 3 bits are for error information and 8 bits are for transmission data.

14. The modem of claim 13 wherein said line status register has three locations dedicated to storing and passing said error information.

15. A method of improving data integrity for mixed interleaved and non-inteleaved data writes from a modem controller to a MIMIC FIFO register, wherein a plurality of interleaved and non-interleaved data sets are written from said modem controller to said MIMIC FIFO register, said method comprising the steps of:
  for ones of said interleaved data sets, causing associated error data to be concurrently written to a line status register, wherein content of said line status register is read into a defined portion of said MIMIC FIFO register during each write cycle; and;
  upon said line status register content being read into said MIMIC FIFO register for a given write cycle, and before a beginning of a next-successive write cycle, causing said line status register to be cleared of any pre-existing content.

16. The method of claim 15 wherein said step of clearing said line status register enables said controller to be operable to provide interleaved and non-interleaved data writes to said FIFO.

17. The method of claim 16 wherein said step of clearing said line status register is performed through a clearing circuit having a write control signal for said MIMIC FIFO register, a system clock and a system reset signal electrically connected thereto.

18. The method of claim 17 wherein said clearing circuit is triggered through a clearing pulse upon the completion of a cycle of said FIFO write control signal.

19. The method of claim 18 wherein said MIMIC FIFO is a receiver channel (Rx) FIFO.

20. The method of claim 19 wherein said Rx FIFO is 11 bits wide, wherein 3 bits are for error information and 8 bits are for transmission data.

21. The method of claim 20 wherein said line status register has three locations dedicated to storing and passing said error information.

* * * * *